May 31, 1927.
H. B. BURLEY
1,630,922
APPARATUS FOR THE MANUFACTURE OF ELECTRIC WIRES
Filed Feb. 6, 1922
2 Sheets-Sheet 1
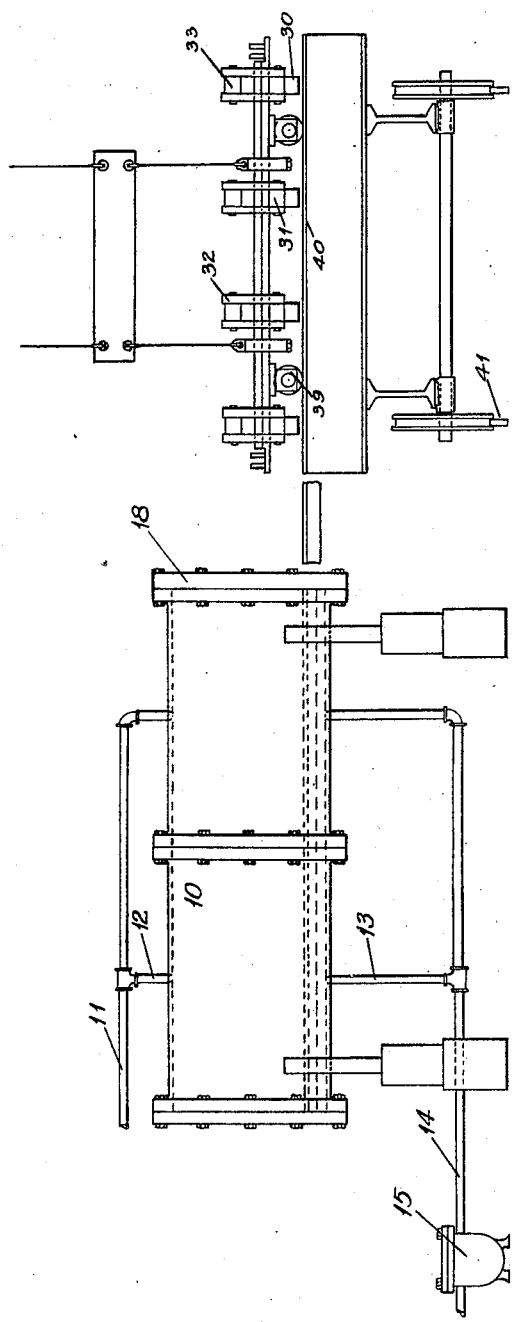
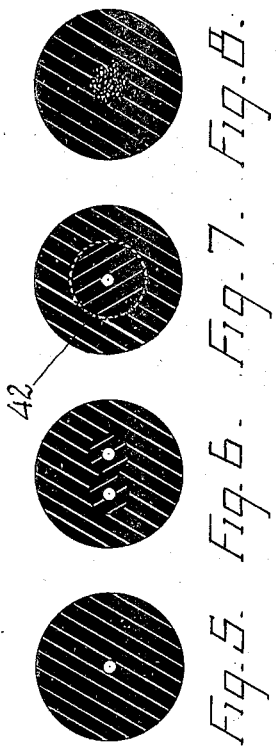
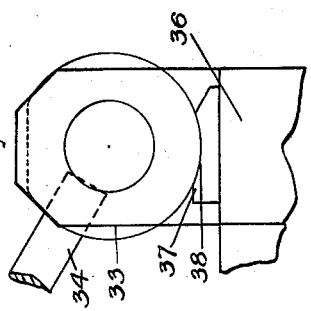
Inventor
Harry B. Burley
by
I. Paris  Attorney May 31, 1927.
H. B. BURLEY
1,630,922
APPARATUS FOR THE MANUFACTURE OF ELECTRIC WIRES
Filed Feb. 6, 1922     2 Sheets-Sheet 2
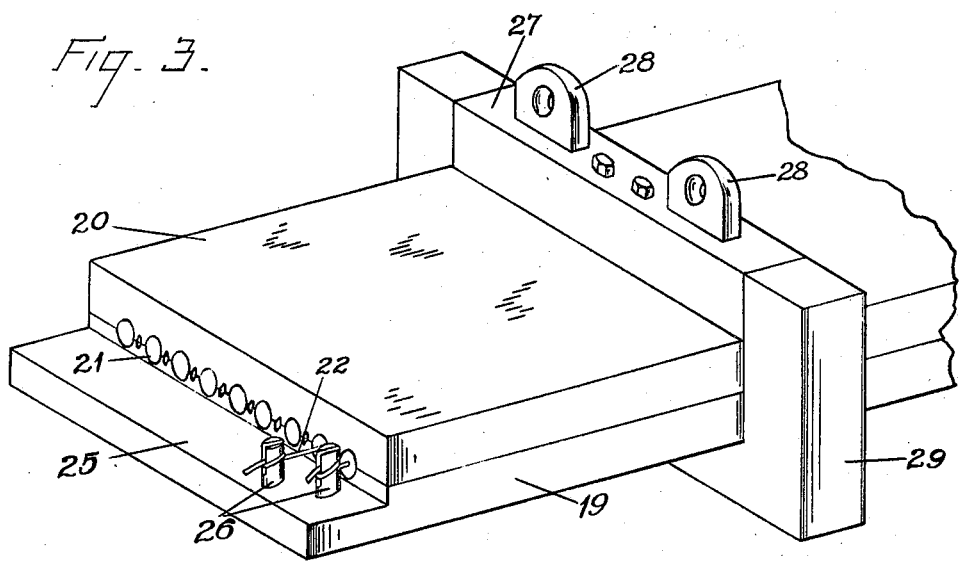
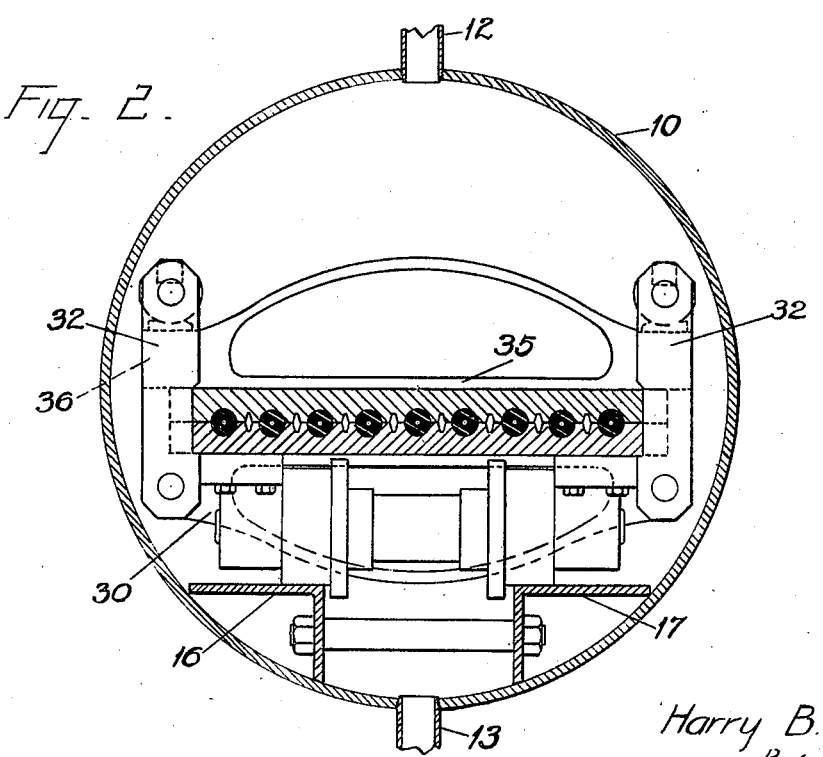

Patented May 31, 1927.

1,630,922

UNITED STATES PATENT OFFICE.

HARRY B. BURLEY, OF BROOKLINE, MASSACHUSETTS, ASSIGNOR TO BOSTON INSULATED WIRE & CABLE COMPANY, A CORPORATION OF MASSACHUSETTS.

APPARATUS FOR THE MANUFACTURE OF ELECTRIC WIRES.

Application filed February 6, 1922. Serial No. 534,628.

My invention relates to the manufacture of rubber insulated electric wires or cables. In the manufacture of such wires the conductor, whether it be of the solid conductor type or of the stranded wire type, is first covered with the rubber compound in a manner well known in the art. The wire covered with this compound is subsequently vulcanized.

My invention is directed to the process and apparatus for vulcanizing the rubber compound of the rubber covered wire or cable.

Generally the process of vulcanization comprises admixing to the rubber certain well known ingredients, covering the conductor with the rubber compound, and placing the wire or cable thus formed in a closed chamber where it is subjected to heat by dry steam at a predetermined temperature and pressure for a predetermined period of time. This invention is not concerned with the specific ingredients of the rubber compound. The composition of my rubber compound may be varied in a manner well known by those skilled in the art.

The essential principle of my invention is the vulcanization of the rubber on a rubber insulated electric wire or cable while the wire or cable is enclosed in a confined space. In accordance with my invention the step of vulcanization is performed with the cable confined in a mold. In this process the rubber when heated becomes semi-fluid, expands and thereby generates high pressures within the mold.

My apparatus for carrying out my process comprises a vulcanizing chamber, a mold and means for transferring the mold in and from the chamber. The mold is designed to receive the wire or cable and confine it within a space substantially equal to the volume of the wire or cable. The mold comprises two plates provided with groves for enclosing the wire or cable between the plates and with additional grooves designed to receive any of the semi-fluid rubber that may force its way between the plates of the mold.

Among the advantages that flow from the use of my process and apparatus are the following:

The form of the insulation is retained during vulcanization with the result that the finished wire or cable has the insulation distributed evenly and symmetrically with relation to the conductor.

In the old processes of vulcanization of rubber compounds, it is frequently found that the vulcanized rubber is porous. This obviously is highly undesirable. This defect is entirely overcome by the use of my process and apparatus.

Other advantages flowing from the use of my process and apparatus are that the length of time for vulcanizing is shortened; the rubber is forced into all the interstices between and around the outer strands or the outer groups of stranded wires without insulating any of the wires from their adjacent wires. The wearing qualities, the insulating qualities and the dielectric strength of the rubber are improved.

My process and apparatus will be explained in greater detail hereinafter by reference to the accompanying drawings.

Fig. 1 is an illustration of the entire apparatus used in carrying out my process.

Fig. 2 is a section of the vulcanizing chamber with the mold placed within it.

Fig. 3 shows a perspective end view of the mold.

Fig. 4 is a detail of the clamping means.

Figs. 5, 6, 7 and 8 are sections of different types of wires manufactured by the process and apparatus herein disclosed.

Referring to the drawings, 10 constitutes the vulcanizing chamber, which may be of any length and diameter desired. The steam or any other heating fluid enters the chamber through the inlet pipe 11 and branches 12. Branches 13 are the outlets from the different portions of the chamber and lead to the common outlet 14. The steam trap 15 placed in the outlet 14 allows condensed steam to flow out of the system but prevents the escape of live steam.

The chamber 10 is provided in its interior with angle irons 16, 17. These constitute a support for the mold and trucks upon which the mold rests. The angle irons also serve to guide the mold during its entry and removal from the chamber. The door 18 of the chamber when bolted makes an air-tight closure.

The mold may be of any length desired but usually approximates the length of the chamber. The mold comprises two plates 19 and 20. The abutting faces of these plates are provided with longitudinal grooves 21, 22 semi-circular in cross-section for the reception of the rubber covered wires. These grooves are so disposed on the faces of the plates that when the plates abut the grooves coincide thereby providing circular grooves the entire length of the mold. The number of grooves may vary. The plates are additionally provided with corresponding grooves 23, 24 intermediate the wire receiving grooves. These grooves may be of any shape or cross-section and serve to receive the overflow of rubber from the wire receiving grooves during the process of vulcanization.

The lower plate 19 is provided with integral portions 25 at each end of the plate, which project beyond the ends of the upper plate. These portions are provided with slotted posts 26, one for each wire receiving groove, to which the ends of the wires are firmly attached in the manner shown.

The upper plate 20 has bolted thereto a plurality of transverse members 27 equal in length to the width of the plate. The member 27 is provided with apertured lugs 28 adapted to be attached to a hoisting apparatus for raising and lowering the plate. The lower plate 19 has bolted thereto a corresponding number of U shaped members 29. The legs of each member 29 project above the mold and flush with the edges thereof and in such a manner as to serve in cooperation with the ends of the members 27 as guides for the positioning of the upper plate 20 in relation to the lower plate 19.

The lower plate 19 is also provided with a plurality of transverse members 30 provided at each end with an apertured projecting portion projecting beyond the edges of the plate. Two arms 32 are pivotally attached to portion 31. At the free ends of the arms 32 is pivoted an eccentric clamping member 33, which is provided with an operating lever 34. The upper plate 20 is provided with a plurality of transverse members 35 corresponding in number to and cooperating with the members 30 and the clamping elements. The arms 32 stride portions 36 of the members 35. A removable plate 37 having a curved face 38 which cooperates with the eccentric 33 to clamp the plates rests on the portion 35.

The plate 19 of the mold rests on a series of trucks 39 which travel on the tracks 40. The tracks 40 in their turn are adapted to travel on stationary tracks 41. This arrangement permits the mold to be transferred from a position in front of one chamber to a position in front of another chamber of the battery of vulcanizing chambers.

The following is a description of the process as carried out in practice by means of the apparatus herein shown:

The conductor which may be of any type shown in Figures 5, 6, 7 and 8 is covered with the rubber compound in a manner well known in the art. The wire is then cut into uniform lengths. With the upper plate 20 raised a length of wire is placed in each of the grooves 21. One end of the wire is attached to the corresponding post 26 in the manner shown. A workman skilled in the process pulls the free end of the wire to a certain degree of tautness and attaches the free end of the wire to the corresponding post 26 at the other end of the plate. All or any number of the grooves 21, of which there may be any desired number, are filled with unvulcanized rubber covered wire in this manner. The upper plate 20 is then lowered into position, the U shaped members 29 serving to guide it into proper alinement. The plates are then clamped by the means previously described. The diameter of the insulated wire is substantially equal to the diameter of the circular grooves. The wires thus completely fill these grooves and are held therein. The mold and trucks 30 are now placed in the vulcanizing chamber 10. The angle irons 16, 17 serve as guides and tracks for the wheels of the trucks. The chamber is then closed air-tight. Steam or any other heating fluid at vulcanizing temperature and pressure is allowed to flow into the chamber for a predetermined length of time. During this treatment the rubber becomes semi-fluid and expands. This causes the rubber to be subjected to high pressure. The pressure is such as to cause the excessive rubber to flow in a thin sheet between the plates and partly fill the grooves 24, 25. At the end of the vulcanization period the steam is shut off, the mold is removed from the chamber, the plate 20 is raised, and the wires are removed from the mold. The apparatus is now free to receive another charge.

Figures 5, 6, 7 and 8 show some different types of wires which I manufacture by the use of my process and apparatus described herein.

Figure 5 shows a rubber insulated solid conductor.

Figure 6 shows a double conductor wire, each of the wires being insulated from the other.

Figure 7 shows a high voltage wire or cable. This wire is made by embedding an interlayer 42 of fibrous material between two layers of rubber compound insulation. The interlayer of fibrous material may be wound, braided or formed to enclose the inner layer of rubber insulation in any manner desired. Both layers of rubber with the interlayer of fibrous material are vulcanized simultaneously by the process and apparatus described herein. The wire shown in Fig. 7 has a higher voltage carrying capacity than a similar wire which is not provided with an interlayer of material. The fibrous material may be cotton, flax, hemp or similar material of a flexible character. The interlayer of this material has an electrical conductivity substantially greater than the conductivity of the rubber insulation.

Figure 8 shows a wire in which the conductor consists of several groups of stranded conductors. It will be seen that as a result of the use of my process and apparatus the rubber insulation fills all the space and interstices between the outer conductors.

The composition of the rubber compound does not constitute a part of my invention. The composition I use is as follows and varies between the limits given in the following tabulation:

|  | Per cent. |
|---|---|
| Rubber | 20 to 35 |
| Mineral matter | 30 to 50 |
| Hydrocarbons | 10 to 20 |
| Litharge | 8 to 12 |
| Sulphur | 3 to 5 |

The temperature of the steam may be varied with the composition. The temperature and pressure that I find to give the best results are in the vicinity of 280 degrees F and 35 pounds gage respectively.

The time of vulcanization also varies with the other factors In my practice I find three quarters of an hour to give the best results.

In my process the time of vulcanization is shortened as compared with the other methods of vulcanizing.

The product obtained by the use of my process is a wire in which the rubber is in intimate contact with the conductor. If the wire is of the stranded wire type the rubber completely fills all the interstices between the outer strands or groups of conductors.

The rubber of the wire or cable produced by the use of my process has a high dielectric strength. This makes my process particularly applicable to wire or cables intended for high voltage transmission. One of the uses to which the wires made by my process are commonly put is in wiring ignition systems in internal combustion engines.

I claim:—

1. An apparatus for the vulcanization of the rubber insulation of rubber covered electric wire comprising a plate having a plurality of longitudinal grooves on its face for receiving rubber covered wire of predetermined lengths, means near the end of the plates for fastening said wires, a series of wheeled trucks supporting said plate, a series of clamping elements disposed in pairs on opposite sides of said plate and pivotally attached thereto, a series of fixed guides disposed in pairs on opposite sides of the plate, a cooperating plate having corresponding longitudinal grooves on its abutting face, and cross members attached to the outer face of said second plate cooperating with the clamping members for clamping the plates together.

2. The apparatus recited in claim 1 in which the dimensions of the grooves are such that the rubber is subjected to high pressures when the plates and rubber covered wire held within the grooves are submitted to vulcanizing temperature.

3. The apparatus recited in claim 1 in combination with a vulcanizing chamber for enclosing said plates and wires, and a pair of tracks for the wheels of said trucks disposed within said chamber.

4. An apparatus for the vulcanization of rubber covered electric wires comprising a pair of cooperating plates, the abutting face of each plate having a plurality of longitudinal grooves adapted to receive the rubber covered wire, a plurality of reenforcing members disposed on the outer faces of said plates and transversely thereof, projecting beyond the longitudinal edges of said plates, a pair of arms pivoted on said projecting portions of some of said reenforcing members, adapted to stride the projecting portions of the cooperating reenforcing members, and an eccentric clamping device disposed at the free ends of said arms.

In testimony whereof I hereunto affix my signature.

HARRY B. BURLEY.